US006934337B2

(12) United States Patent
Lippincott

(10) Patent No.: US 6,934,337 B2
(45) Date of Patent: Aug. 23, 2005

(54) VIDEO CAPTURE DEVICE AND METHOD OF SENDING HIGH QUALITY VIDEO OVER A LOW DATA RATE LINK

(75) Inventor: Louis A. Lippincott, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 09/965,491

(22) Filed: Sep. 27, 2001

(65) Prior Publication Data

US 2003/0058935 A1 Mar. 27, 2003

(51) Int. Cl.[7] .............................................. H04N 7/12
(52) U.S. Cl. .................................................. 375/240.2
(58) Field of Search ........................ 375/240.11, 240.19, 375/240.2, 240.24, 240.26, 240.18, 240.21; 382/243, 248, 250; 348/634, 420.1, 424.1; 709/247

(56) References Cited

U.S. PATENT DOCUMENTS

| | | | | |
|---|---|---|---|---|
| 4,698,689 | A | | 10/1987 | Tzou ........................... 358/260 |
| 5,845,041 | A | * | 12/1998 | Ohkuma et al. .............. 386/68 |
| 6,101,276 | A | | 8/2000 | Adiletta et al. ............. 382/236 |
| 6,263,022 | B1 | | 7/2001 | Chen et al. ............. 375/240.03 |
| 6,275,263 | B1 | | 8/2001 | Hu .............................. 348/453 |
| 6,356,663 | B1 | * | 3/2002 | Korta et al. ................. 382/239 |
| 6,556,719 | B1 | * | 4/2003 | Monro ........................ 382/248 |

FOREIGN PATENT DOCUMENTS

| | | | | |
|---|---|---|---|---|
| WO | WO-96/29818 | | 9/1996 | ............ H04N/1/41 |
| WO | WO-98/37699 | | 8/1998 | ............ H04N/7/26 |
| WO | WO-98/37700 | | 8/1998 | ............ H04N/7/30 |
| WO | WO-00/65834 | | 11/2000 | ............ H04N/7/173 |

OTHER PUBLICATIONS

Takikawa, K., "Fast progressive reconstruction of a transformed image", IEEE Trans. on Information Theory, vol. 30, Issue 1, pp. 111–117, Jan. 1984.*

Westerink et al, "Progressive Transmission of Images Using Subband Coding", IEEE, 1989.*

* cited by examiner

Primary Examiner—Vu Le
(74) Attorney, Agent, or Firm—Schwegman, Lundberg, Woessner & Kluth, P.A.

(57) ABSTRACT

A video reception device, such as personal computer, generates high quality video from video data received from a video capture device over a low data rate communication interface such as a USB interface. The video data is received by the reception device in two passes. The first pass provides a low frequency portion of coefficients and the second pass provides a high frequency portion of coefficients. The coefficients representing the video are generated by performing a Discrete Cosine Transform (DCT) on blocks of pixels and compressing a portion of the coefficients. In one embodiment, the video reception device matches a frame received during the first pass with a frame received during the second pass and signals the video capture device to switch from compressing the low frequency portion of coefficients to compressing the high frequency portion. In an alternate embodiment, frames received in the first and second passes are stored at the reception device and a key frame may be used to synchronize the frames received from each pass.

28 Claims, 6 Drawing Sheets

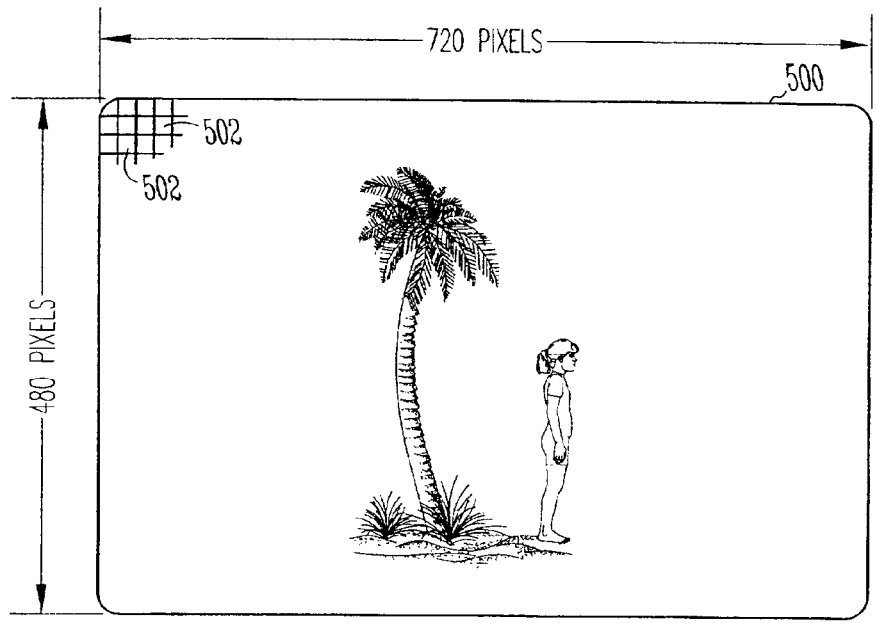
Fig. 5
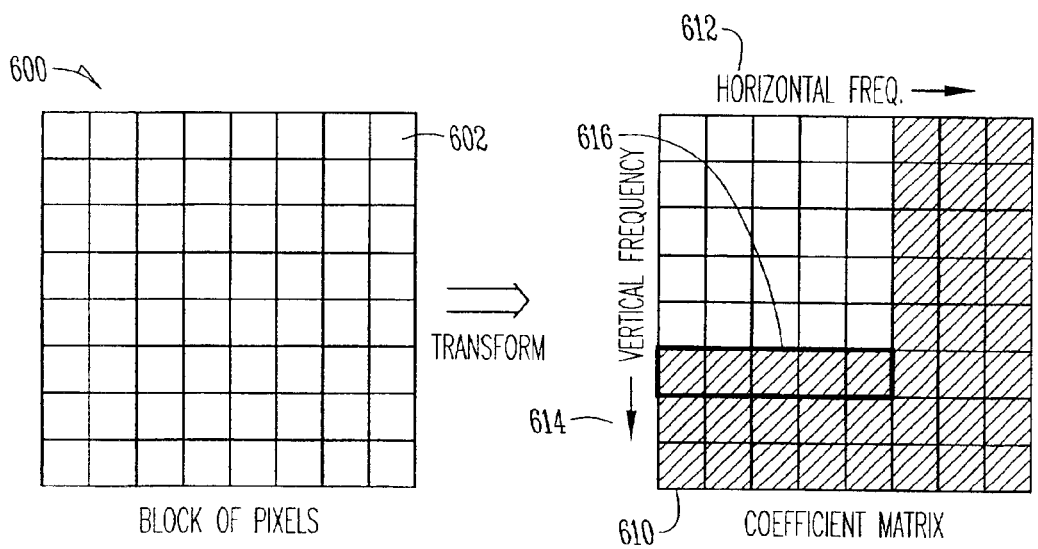
Fig. 6A
Fig. 6B

VIDEO CAPTURE DEVICE AND METHOD OF SENDING HIGH QUALITY VIDEO OVER A LOW DATA RATE LINK

FIELD OF THE INVENTION

The present invention pertains to video compression, and in particular, to the transmission of compressed video data, and more particularly to the transmission of compressed video data over low data rate interfaces to capture high quality video.

BACKGROUND OF THE INVENTION

With the development of multi-media systems, the prospect of capturing high quality video on a computer system has become desirable. However, capturing high quality video is difficult because video capture devices commonly utilize a low data rate interface, such as universal serial bus (USB) to send video data to a computer. A USB interface, for example, has a significantly smaller data rate than the actual video data rate and a much smaller data rate than required to capture high quality video.

Each frame of video generally takes the form of many thousands of pixels where each pixel can be represented by several bytes of data. For example, a conventional video frame may be comprised of 720×480 pixels and each pixel may be represented by three bytes. At a conventional rate of 30 frames per second and without the use of compression techniques, transmission of conventional video requires a data rate of at least 250 Mega bits per second (Mbps). At present, a USB interface can support a maximum data rate of about 12 Mbps of which only about 5–8 Mbps can be sustained. Conventional compression techniques used to compress video data prior to transmission over a USB interface result in poor quality video because the compression techniques result in a loss of data.

For example, one conventional method of reducing information in compressed video images is to discard higher frequency components of the video images. This technique works because the human vision system is not as sensitive to high frequency video components as it is to low frequency video components. While this technique does reduce the amount of information that is conveyed, the video images lose detail and may begin to look blurry. Another conventional method of reducing information in compressed video images involves quantizing the image parameters. Although this technique improves the encoding operation, images appear blocky because gradual changes may take on the appearance of stepped changes in the video image.

Thus there is a need for a method and apparatus that provides high quality video capture using a low data rate interface. There is also a need for a video capture device and method of sending high quality video over a low data rate interface. There is also a need for method of generating high quality video with information received over a low data rate interface. There is also a need for a method and video capture device for compressing and sending video over a USB interface to capture high quality video.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

FIG. 5 illustrates a conventional video frame comprised of pixels in accordance with an embodiment of the present invention;

FIG. 6A illustrates a block of pixels in accordance with an embodiment of the present invention;

FIG. 6B illustrates a coefficient matrix representing a block of pixels in accordance with an embodiment of the present invention;

The description set out herein illustrates the various embodiments of the invention and such description is not intended to be construed as limiting in any manner.

DETAILED DESCRIPTION

The present invention is related to video capture methods and video capture devices. In one embodiment, a video reception device, such as personal computer, generates high quality video from two sets of compressed coefficients received over a low data rate communication interface such as a USB interface. The video is transferred to the video reception device in two passes. The first pass may provide a low frequency portion of coefficients and the second pass may provide a high frequency portion of coefficients. The coefficients may be generated by performing a Discrete Cosine Transform (DCT) on blocks of pixels and compressing a portion of the coefficients for each block of pixels. In one embodiment, the reception device matches a frame received during the first pass with a frame received during the second pass and signals the video capture device to switch from compressing the low frequency coefficients to compressing the high frequency portion for subsequent frames. In an alternate embodiment, frames received in the first and second passes may be stored at the reception device and a key frame may be used to synchronize the frames received from each pass.

Figure 1:
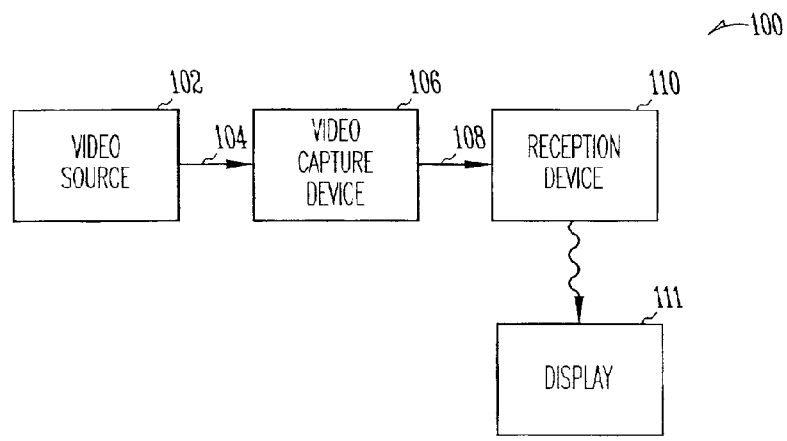
FIG. 1 illustrates a functional block diagram of a video capture system in accordance with an embodiment of the present invention.

FIG. 1 illustrates a functional block diagram of a video capture system in accordance with an embodiment of the present invention. Video capture system 100 includes video source 102 coupled by video link 104 to video capture device 106. Video capture system 100 also includes link 108 coupling video capture device 106 with video reception device 110. Video reception device 110 may be coupled with display 111. In accordance with one embodiment, video source 102 provides analog video over video link 104 to video capture device 106. Video source 102 may be any source of video which can provide video in a high quality form. Video source 102 may provide video in either analog or digital form over video link 104. Video source 102 may include video cassette recorders (VCR), cam-corders or other device that may have video stored on magnetic tape or other storage means. Video link 104 may be a coaxial cable, however any communication link that can communicate high quality video may be suitable. Video source 102 may provide high quality video in an analog format, such as the NTSC or PAL formats. Video source 102 may provide video, for example, at a rate of 30 frames per second, although other rates are equally suitable for use with the present invention. Each video frame may be separated by a vertical blanking interval (VBI). Each frame is comprised of a plurality of pixels. For example, a frame may comprise an array of 720×480 pixels.

Video capture device 106 processes video received from video source 102 converting the video to a form suitable for transmission over link 108 to video reception device 110. In accordance with one embodiment of the present invention, video is transferred to video reception device 110 in two passes. During the first pass, video capture device 106 generates coefficients from blocks of pixels, compresses a first portion of the coefficients, and sends the compressed first portion of coefficients to video reception device 110. During the second pass, video capture device 106 generates coefficients from blocks of pixels, compresses a second portion of the coefficients, and sends the compressed second portion of coefficients to video reception device 110. The coefficients may be generated by encoding blocks of pixels. The encoding may include performing a DCT on 8×8 blocks of pixels.

Among other things, reception device 110 separately receives and decompresses the first and second portions of coefficients, combines the decompressed first portion of coefficients with the decompressed second portion of coefficients to generate a combined coefficient matrix corresponding with the block of pixels. Reception device 110 may be a personal computer or other device having functionality described herein. Link 108 may be any communication link, however a low data rate link may be utilized. For example, link 108 may be provided by a low data rate communication interface such as a USB interface.

Figure 2:
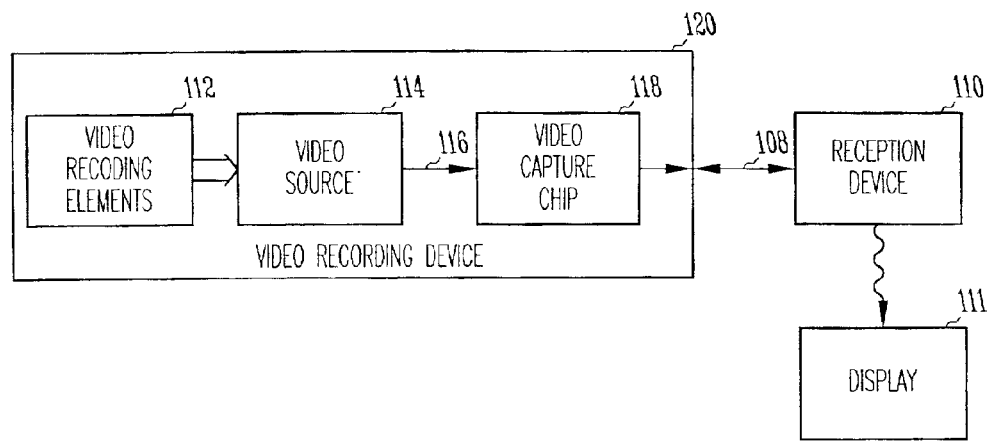
FIG. 2 illustrates a functional block diagram of a video capture system in accordance with another embodiment of the present invention.

FIG. 2 illustrates a functional block diagram of a video capture system in accordance with another embodiment of the present invention. In the embodiment illustrated in FIG. 2, video recording device 120 includes video recording elements 112, video source 114 and video capture chip 118. In this embodiment, video recording device 120 may be a VCR, cam-corder or a portable video recording device. Video capture chip 118 provides functionality corresponding with video capture device 106 (FIG. 1), and video source 114 provides the functionality corresponding with video source 102 (FIG. 1). Video recording elements 112 provide for recording and storing video in a high quality format and transferring high quality video to video source 114. Internal link 116 may be a bus or other communication path within video recording device 120 suitable for transferring high quality video to video capture chip 118.

Figure 3:
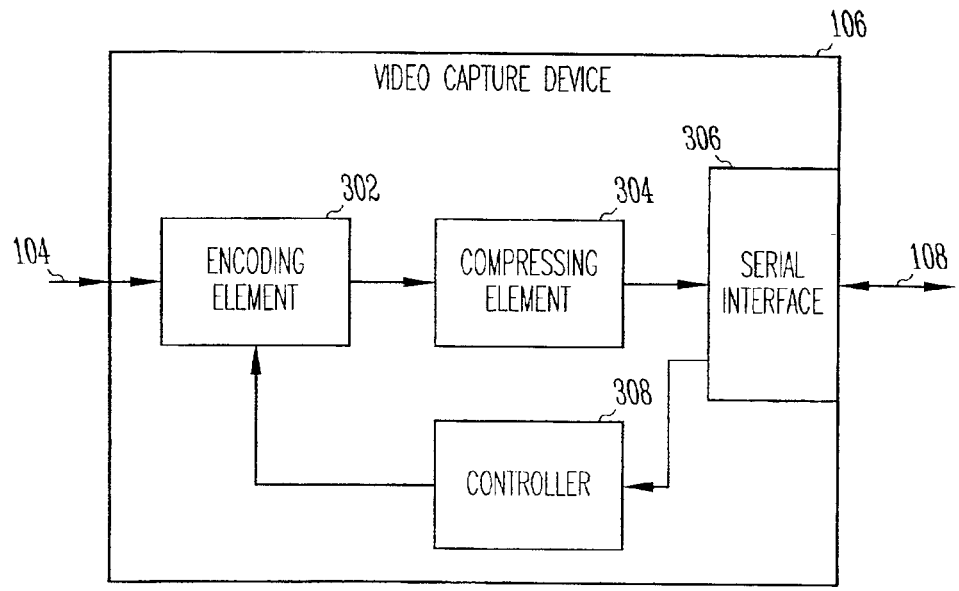
FIG. 3 illustrates a functional block diagram of a video capture device in accordance with an embodiment of the present invention.

FIG. 3 illustrates a functional block diagram of a video capture device in accordance with an embodiment of the present invention. Video capture device 106 may include encoding element 302 to convert analog video frames to digital video frames and encode the digital frames. Compressing element 304 processes the digital video frames and may provide compressed coefficients representing the digital video frames. Serial interface 306 may transfer the compressed coefficients over link 108. Controller 308 controls the operation of compressing element 304 and encoding element 302 and may be implemented with one or more processors configurable with software.

In accordance with one embodiment, a frame of a sequence of high quality analog video frames is received at by encoding element 302. Encoding element converts a frame of the sequence of analog video frames to a digital video frame. Each pixel of the frame, for example, may be represented by one byte for black and white video and three bytes for color video. In one embodiment of the present invention, video capture device 106 may receive a sequence of frames in digital form and accordingly, encoding element 302 may refrain from performing an analog to digital conversion. Encoding element 302 encodes blocks of pixels of each frame to generate a block of coefficients. In one embodiment, encoding element 302 performs a Discrete Cosine Transform (DCT) on each 8×8 block of the pixels in the frame resulting in a corresponding 8×8 matrix of DCT coefficients. Typically, the DCT process is two dimensional, where a DCT is performed on each row and column of pixels of the block.

Compressing element 304 compresses a portion of each matrix of coefficients. In accordance with one embodiment of the present invention, compressing element 304 compresses a low frequency portion of the coefficients during a first pass, and a high frequency portion of the coefficients during a second pass. Controller 308 instructs compressing element 304 to switch between compressing the low frequency portion and high frequency portion of the coefficients. Compressing element 304 may also provide the compressed coefficients to serial interface 306 which sends the compressed coefficients to a video reception device.

Figure 4:
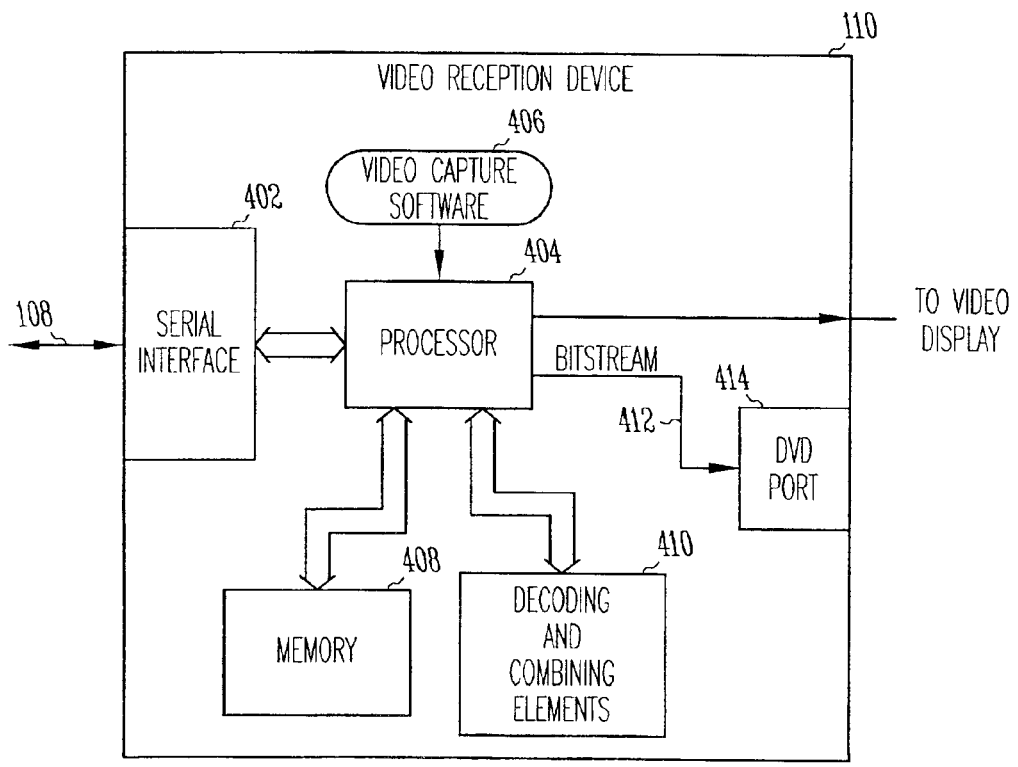
FIG. 4 illustrates a functional block diagram of a video reception device in accordance with an embodiment of the present invention.

FIG. 4 illustrates a functional block diagram of a video reception device in accordance with an embodiment of the present invention. Video reception device 110 includes serial interface 402 to receive compressed coefficients from a video capture device. Processor 404 operates on the compressed coefficients in accordance with video capture software 406 to provide bit stream 412 representing high quality video. Video reception device 110 may be a computer configured with software and hardware as required perform the operations described herein. In general, video reception device 110 may generate a high quality video from coefficients received from a video capture device.

In accordance with one embodiment of the present invention, video is transferred to video reception device 110 in two passes. The first pass provides a first portion of coefficients and the second pass provides a second portion of coefficients. The video capture device generates the coefficients by encoding blocks of pixels and compressing a portion of the coefficients for each block of pixels of a frame. Decoding and combining elements 410 combine corresponding coefficients of each block of pixels, and decodes the combined coefficient matrices. Processor 404 may convert the decoded matrices to a bit stream representing the video. Memory 408 may store coefficients received during the first pass in compressed or decompressed form for use in processing coefficients received during the second pass.

Decoding and combining elements 410 may be comprised of hardware accelerators dedicated to performing combining and decoding operations, or may be comprised of processors configurable with software. In one embodiment of the present invention, decoding and combining elements 410 are implemented as part of processor 404 as configured with software. Bit stream 412 representing high quality video may be stored in memory 408 or may be stored to an external storage device such as digital video disc (DVD) or writeable compact disc (CD) through port 414. In one embodiment, bit stream may converted to a form suitable for displaying directly on video display 111 (FIG. 1) which may be a computer monitor coupled with video reception device 110.

FIG. 5 illustrates a conventional video frame made up of pixels in accordance with one embodiment of the present invention. Video frame 500 is comprised of a plurality of pixels. In accordance with one embodiment, video frame 500 comprises a matrix of 720×480 pixels, however video frames having a greater or lesser number of pixels are equally suitable for the present invention. Each pixel 502 of frame 500, for example, may be represented by one byte of data for black and white video and three bytes of data for color video.

FIG. 6A illustrates a block of pixels in accordance with one embodiment of the present invention. FIG. 6B illustrates a coefficient matrix representing a block of pixels in accordance with an embodiment of the present invention. Block of pixels 600 makes up a portion of video frame 500 (FIG. 5). In other words, video frame 500 (FIG. 5) is comprised of may blocks of pixels. In the example when block of pixels 600 is an 8×8 block and video frame 500 (FIG. 5) is 720×480 pixels, there are 5400 blocks of pixels 600 per video frame.

In accordance with one embodiment of the present invention, block of pixels 600 is transformed into coefficient matrix 610. Each coefficient of coefficient matrix 610 may have contributions from many of the pixels in block of pixels 600. In other words, all coefficients of coefficient matrix 610 represent all pixels of block 600. Coefficient matrix 610 is comprised of coefficients having horizontal frequency components 612 and vertical frequency components 614. Horizontal frequency components 612 representing higher horizontal frequencies are located furthest from the left as illustrated in coefficient matrix 610. Vertical frequency components 614 representing higher vertical frequencies are located furthest from the top as illustrated in coefficient matrix 610. The shaded portion of coefficient matrix 610 represents the coefficients having higher vertical and horizontal frequency components, while the non-shaded portion represents coefficients of matrix 610 having lower vertical and horizontal frequency components. Coefficients of matrix 610 may be generated by performing a transform, such as a DCT, on block of pixels 600.

In accordance with one embodiment of the present invention, a portion of coefficients of matrix 610 are compressed during a first pass and second portion of coefficients of matrix 610 are compressed during a second pass. For example, the low frequency portion may be compressed during the first pass, and the high frequency portion may be compressed during the second pass. In this embodiment, when coefficient matrix 610 is a block of 64 coefficients as illustrated, the 25 low frequency coefficients (shown as non-shaded) may be compressed and sent during the first pass while the 39 high frequency coefficients (shown as shaded) may be compressed and sent during the second pass. In an alternate embodiment, less than all coefficients may be sent during both passes.

In accordance with another embodiment of the present invention, the same number of coefficients that are compressed during the first pass are compressed during the second pass. In this embodiment, when coefficient matrix 610 a block of 64 coefficients as illustrated, seven of the higher frequency coefficients may be compressed during the first pass along with the 25 low frequency coefficients so that 32 of the high frequency coefficients may be compressed and send during the second pass.

In accordance with yet another embodiment of the present invention, when coefficient matrix 610 a block of 64 coefficients as illustrated, during the first pass the 25 low frequency coefficients and an additional five higher frequency components may be compressed, and during the second pass, the remaining 34 high frequency coefficients are compressed and sent. The five higher frequency coefficients may be the coefficients of block 616. Other combinations of compressing coefficients are also suitable for use with the various embodiments of the present invention.

Figure 7:
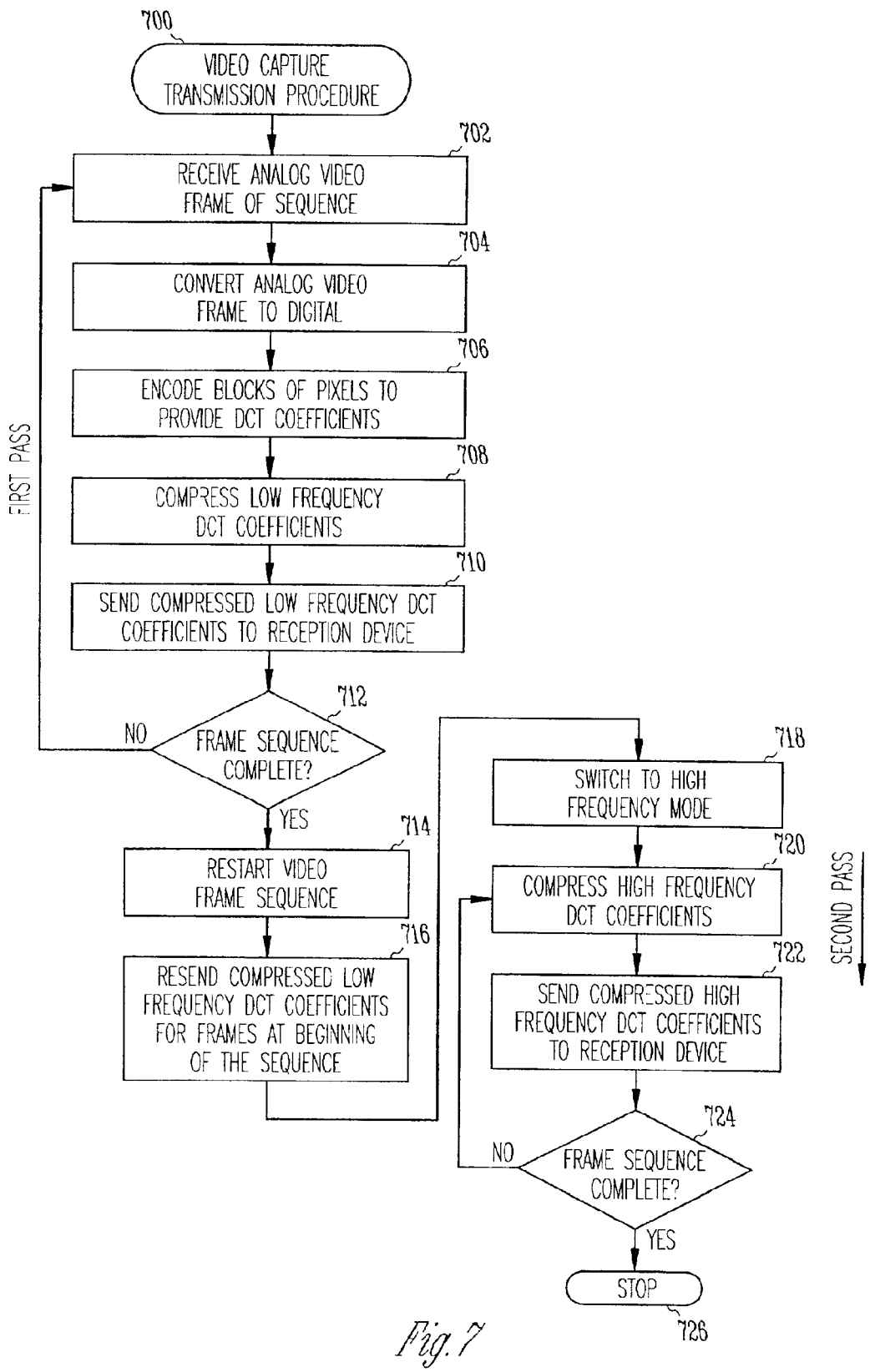
FIG. 7 is a flow chart of a video capture transmission procedure in accordance with an embodiment of the present invention.

FIG. 7 is a flow chart of a video capture transmission procedure in accordance with an embodiment of the present invention. Video capture transmission procedure 700 in general, provides video to a video reception device to generate high quality video. In accordance with the embodiment described in procedure 700, video is transferred to a reception device in two passes. The first pass provides a first portion of coefficients and the second pass provides a second portion of coefficients. The coefficients are generated by encoding blocks of pixels and compressing a portion of the coefficients for each block of pixels. Video capture transmission procedure 700 may be performed by video capture device such as video capture device 106 (FIG. 3), although other devices may also be suitable.

It operation 702, a frame of a sequence of analog video frames is received at a video capture device. The rate at which the analog video frames are received depends on the video source. Generally, analog video frames may be received at a rate of 30 frames per second, although other rates are equally suitable for use with the present invention. Each analog video frame is generally separated by a VBI. Each frame is comprised of a plurality of pixels. For example, a frame may comprise an array of 720×480 pixels. Many analog formats of video are suitable for use with the present invention including NTSC and PAL analog formats.

In operation 704, a frame of the sequence of analog video frames is converted to a digital video frame. Each pixel of the frame, for example, may be represented by one byte for black and white video and three bytes for color video. Operation 704 may be performed by an analog to digital converter element of a video capture device. In one embodiment of the present invention, a video capture device may receive a sequence of digital frames in operation 702 and accordingly, operation 704 may not be performed.

In operation 706, the frame of the sequence of digital video frames is encoded and blocks of coefficients are generated representing the frame. In one embodiment, a DCT is performed on each block of pixels resulting in a corresponding matrix of DCT coefficients. Each coefficient has horizontal and vertical frequency components. A portion of the coefficients may be viewed as high frequency coefficients, and another portion of the coefficients may be viewed as low frequency coefficients. (For example, see FIG. 6B.) In general, each coefficient of the matrix is generated from contributions of at least several of the pixels of the block of pixels. In other words, an entire block of coefficients represents an entire block of pixels. Other types of transforms and compressing algorithms may also be suitable for use with the embodiments of the present invention.

In operation 708, a portion of the coefficients of the coefficient matrix is compressed. In accordance with one embodiment, the portion of coefficients that is compressed in operation 708 comprises primarily a low frequency portion of coefficients. Operation 708 is performed for each block of coefficients of a frame.

In operation 710, the compressed portion of coefficients is sent to a video reception device over a communication link. In accordance with one embodiment, a compressed low frequency portion of the matrix of DCT coefficients is sent over a low data rate interface to the video reception device. The low data rate interface may be any communication link including narrow band communication links provided for example, by a USB interface or a wireless interface. In accordance with one embodiment of the present invention, the rate at which data is sent to the video reception device may range between 1 and 20 Mbps. This may correspond with the rate at which frames are processed in operations 702–712 which may be, for example, a rate of 30 frames per second. Operation 710 is performed for each block of coefficients of a frame.

Operation 712 determines when all frames of the sequence have been processed by operations 702 through 710. When all frames of the sequence have not been processed, operations 702–710 are repeated for each frame until the each frame of sequence has been processed. When the frame sequence is complete, operation 714 is performed. Upon the completion of operation 712, procedure 700 has completed a first pass of the video.

In operation 714, the sequence of frames is restarted. For example, when the video is provided by a VCR or camcorder, the video is rewound and replayed. When the video is provided by a memory or from disc, the sequence of frames is read again from the beginning. In one embodiment of the present invention, a "replay" signal may be received from the video reception device and the video capture device may respond to the replay signal by automatically replaying the video.

In operation 716, an analog video frame is converted to digital, encoded and a portion of the coefficients is compressed. The compressed portion of coefficients for each block of pixels of the frame are sent to the video reception device. Desirably, the same portion of coefficients that was compressed is operation 708 is compressed in operation 716. Operation 716 is repeated for each of the initial frames of the video. In one embodiment, operation 716 may include repeating operations 702 through 712 for each of the initial frames of the video.

During the performance of operation 716, the video reception device is processing the received coefficients to match a frame sent in operation 716 with a reference frame sent in the first pass (i.e., operations 702 through 712). When a reference frame is identified, the reception device notifies the video capture device to switch modes. In operation 718, the video capture device may receive a "switch mode" signal during a vertical blanking interval between frames subsequent to the matched frame. In response to receipt of the "switch mode" signal, the video capture device switches modes and begins compressing a different portion of the coefficients than were being compressed and sent in operation 716.

In accordance with one embodiment of the present invention, when low frequency coefficients were compressed during the first pass, the video capture device switches to compressing the high frequency coefficients. The video capture device may implement hardware accelerators or processors configured by software for responding to the "switch mode" signal and performing compression of the different portions of coefficients of a coefficient matrix.

In operation 720, an analog video frame is converted to digital, encoded and the other portion of the coefficients is compressed. In one embodiment, the high frequency portion of coefficients is compressed. In this embodiment, the high frequency portion of coefficients may be exclusive of coefficients of the low frequency portion that were compressed during the first pass.

In operation 722, the portion of coefficients compressed in operation 720 is sent to the video reception device. The same communication link that was used in operation 710 may be used by operation 722. In accordance with one embodiment, blocks 720 and 722 are performed for each block of pixels of a frame of video.

Operation 724 determines when all frames of the sequence after the reference frame have been processed by operations 720 and 722. When all frames of the sequence have not been processed, operations 720 and 722 are repeated for each frame until the each frame of sequence has been processed. When the frame sequence is complete, operation 726 is performed. Upon the completion of operation 724, procedure 700 has completed a second pass of the video. In operation 726, video capture transmission procedure 700 is complete.

Upon completion of procedure 700, the video reception device may now combine both portions of the coefficients for corresponding blocks of pixels of corresponding frames to generate complete matrices of coefficients for each block of pixels for each frame of video. The reception device may then decode the coefficients of each frame to generate a bit stream representing the video and store the representative bit stream as desired.

Figure 8A:
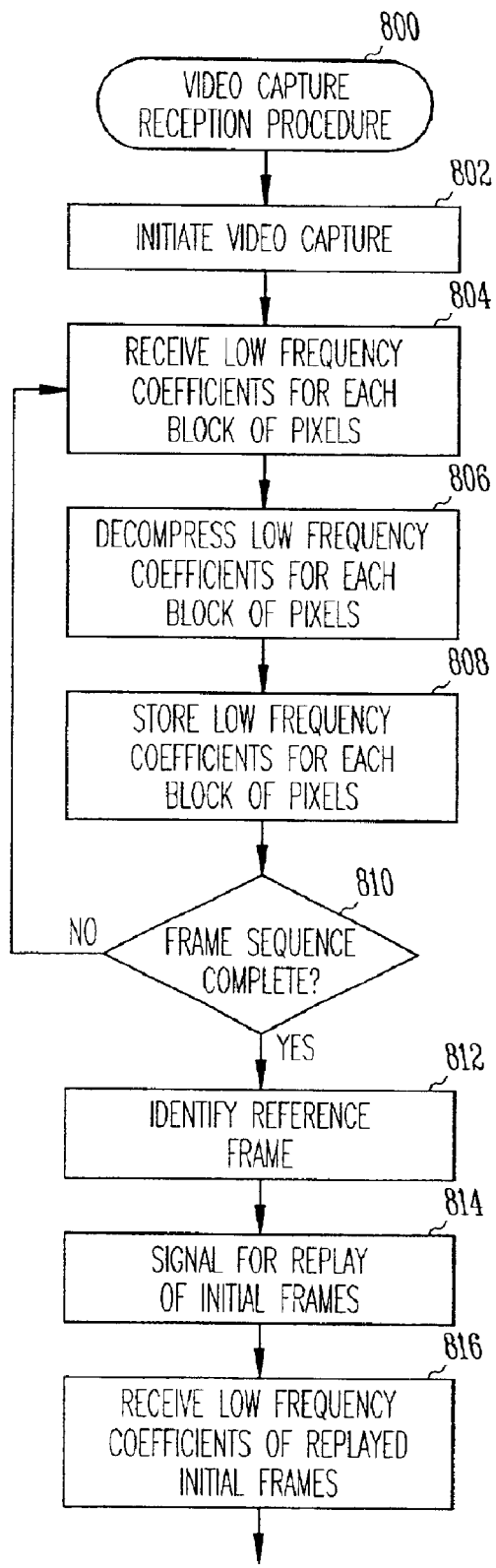
FIGS. 8A and 8B are a flow chart of a video capture reception procedure in accordance with an embodiment of the present invention.
Figure 8B:
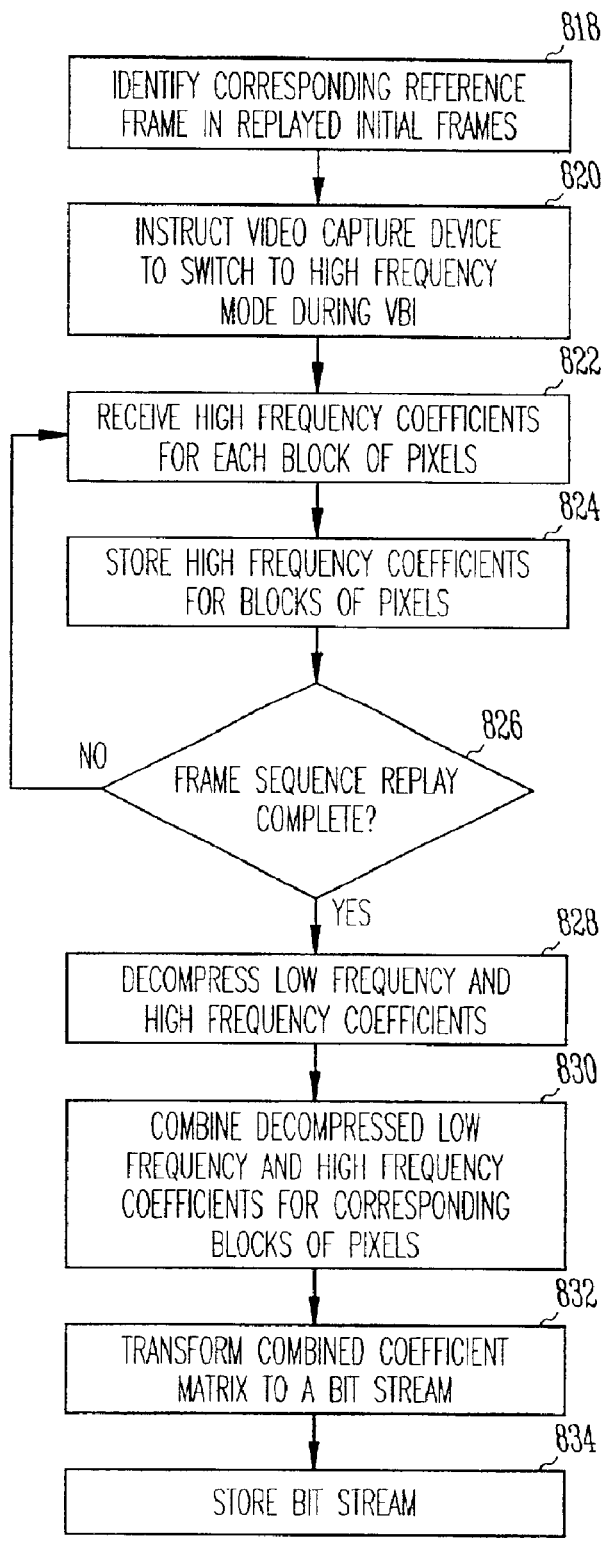

FIGS. 8A and 8B are a flow chart of a video capture reception procedure in accordance with an embodiment of the present invention. Video capture reception procedure 800 may be performed by a video reception device such as a computer configured with software and hardware as required perform the operations of procedure 800. Video reception device 110 (FIG. 4) may also be suitable for performing procedure 800. In general, a video reception device implementing procedure 800 may generate high quality video from coefficients received from a video capture device. In accordance with the embodiment described in procedure 800, video is transferred to the video reception device in two passes. The first pass provides a first portion of coefficients and the second pass provides a second portion of coefficients. A video capture device generates the coefficients by encoding blocks of pixels and compressing a portion of the coefficients for each block of pixels of a frame. In accordance with procedure 800, the corresponding coefficients of each block of pixels for each frame are combined, decoded and converted to a bit stream representing the video.

In operation 802 a video capture reception procedure is initiated. For example, software may be used to configure the elements of a video reception device to perform the subsequent operations of procedure 800. Operation 802 may also send a signal to a video capture device notifying the video capture device that it is ready to receive video data for procedure 800.

In operation 804, the video reception device receives compressed portions of coefficients representing blocks of pixels of a frame of video. In accordance with one embodiment, a first portion of compressed coefficients is received from the video capture device for each block of pixels of a frame in a sequence of frames. The portion of coefficients may be a low frequency portion of compressed DCT coefficients of a block of pixels.

In operation 806, the compressed portion of coefficients for each block of pixels of a frame is decompressed to generate the portion of coefficients representing a block pixels. In operation 808, the decompressed portion of coefficients representing each block pixels for a frame may be stored, for example, at the video reception device. In one embodiment of the present invention, the compressed coefficients are stored.

Operation 810 determines when all frames of the sequence have been processed by operations 804 through 808. When all frames of the sequence have not been processed, operations 804 through 808 are repeated for each frame until the each frame of sequence has been processed. When the frame sequence is complete, operation 812 is performed. Upon the completion of operation 810, the video reception device has performed reception procedure 800 for a first pass of the video. The video reception device may perform operation 810 by determining if the frames received are blank or comprised of noise. In an alternative embodiment, the video reception device may determine all frames have been received in performing operation 810 by waiting a predetermined period of time or after receipt of a predetermined number of frames. In one embodiment of the present invention, the video capture device may send an indication to the video reception device indicating that it has completed the first pass through the video.

In operation 812, a reference frame is identified. The reference frame may be one of the initial frames of the sequence near the beginning of the video and will be used for comparing with subsequently received frames for frame synchronization. The reception device is configured to identify a reference frame with characteristics to allow for easy identification. For example, a reference frame may be a frame that results from a scene change or could be a frame that has significant motion compared to a previous frame. In one embodiment of the present invention, a sequence of reference frames may be identified. It should be noted, that operation 812 may be performed at any time during the performance of procedure 800 after operation 806 and may be performed concurrently with operations 804 through 810 after the receipt of some of the initial frames of the sequence.

In operation 814, the video reception device indicates that it is ready to receive the second portion of compressed coefficients of the sequence of frames. In other words, the video reception device is ready to receive compressed coefficients of the second pass. In one embodiment, operation 814 may include the video reception device displaying an indication for a human operator indicating that the video at the video capture device should be replayed, or rewound and replayed. In another embodiment, operation 814 may include the reception device sending a "replay" signal over a communication link to the video capture device causing the video capture device to replay the video.

In operation 816, the compressed portion of coefficients of blocks of pixels of the initial frames of the sequence are received at the video reception device. The portion of compressed coefficients received in operation 816 should correspond with the portion of compressed coefficients received in operation 804 so that the frames can be easily matched. When compressed low frequency portions of coefficients were received in operation 804, compressed low frequency portions of the coefficients are received in operation 816.

In operation 818, a frame corresponding with the reference frame is identified. Operation 818 may include decompressing the compressed portion of coefficients and decoding the coefficients to generate blocks of pixels for each frame in the initial set until a matching frame is identified. In one embodiment of the present invention, operation 818 may identify a sequence of frames of the initial set of frames for matching to a sequence of reference frames. Operations 816 and 818 may be performed until a frame matching the reference frame is identified. When a frame matching the reference frame is identified, operation 820 is performed.

In operation 820, the reception device provides a "switch mode" signal instructing the video capture device to switch modes. In operation 820, the signal may be transmitted during a vertical blanking interval between frames subsequent to the matched frame. In response to the "switch mode" signal, the video capture device switches to compressing a different portion of coefficients than were received in operation 804. In accordance with one embodiment of the present invention, when low frequency coefficients were being received in operation 804, the video capture device switches to compressing the high frequency coefficients of a coefficient matrix that represents a block of pixels.

In operation 822, the other portion of compressed coefficients is received for each block of pixels of a frame in the sequence of frames. In accordance with one embodiment, operation 822 includes receiving a compressed high frequency portion of coefficients for each block of pixels. In operation 824, the compressed coefficients of each block of pixels received in operation 822 are stored for the frame currently being processed. In one embodiment of the present invention, the coefficients are decompressed before storing.

Operation 826 determines when all frames of the sequence have been processed by operations 822 and 824. When all frames of the sequence have not been processed, operations 822 and 824 are repeated for each frame until the each frame of sequence has been processed. When the frame sequence is complete, operation 828 is performed. Upon the completion of operation 826, procedure 800 has received compressed coefficients for the second pass of the video may begin construction of a high quality video.

In operation 828, both portions of coefficients previously stored in operations 808 and 824 may be decompressed if the coefficients were stored in compressed form. When coefficients are stored in decompressed form, operation 828 may not be performed.

In operation 830, decompressed coefficients from each portion are combined for corresponding blocks of pixels of a corresponding frame to generate a complete coefficient matrix for each block of pixels of a frame. In one embodiment, the low frequency portion of coefficients received during the first pass is combined with the high frequency portion of coefficients received in the second pass to generate a complete coefficient matrix for each block of pixels that comprise a frame.

In operation 832, each complete coefficient matrix of a frame is transformed to bits of bit stream representing the frame. Operation 832 may perform an inverse DCT on each complete coefficient matrix, for example, when a DCT was performed on the blocks of coefficients at the video capture device.

In an alternate embodiment of the present invention, operations 812 through 820 may be skipped. In this embodiment, the video reception device stores the sequence of frames comprised of the low frequency coefficients received during the first pass as well as the sequence of frames comprised of the high frequency coefficients received during the second pass. One or more key frames may be used to synchronize the frames from each pass prior to combining corresponding frames in operation 830. Key frames may be tagged in the video stream and may be frames that are easily identifiable such as scene changes. In this embodiment, operations 828–832 may be performed any time after receipt of the frames of the second pass. In one embodiment of the present invention, an audio track is received along with the video during both passes. In this embodiment, the audio track may be used to align the frames received during the first pass with frames received during the second pass.

In accordance with one embodiment of the present invention, the coefficients received during the second pass are not stored and operation 824 may not be performed. In this embodiment, operations 828 through 832 are performed as the compressed coefficients are received for each frame. In this embodiment, operation 826 may be performed subsequent to operation 832. In operation 834, a bit stream representing the sequence frames is stored at the reception device.

Thus, a video capture device, a video reception device and methods of generating high quality video have been described. High quality video is generated from two sets of coefficients received over a low data rate communication interface such as a USB interface. In accordance with the various embodiments, the coefficients are transferred to the reception device in two passes. The first pass provides a low frequency portion of coefficients and the second pass provides a high frequency portion of coefficients. The coefficients may be generated by performing a transform on blocks of pixels and compressing a portion of the coefficients. The reception device matches a frame received during the first pass with a frame received during the second pass and signals the video capture device to switch from compressing the low frequency coefficients to compressing the high frequency portion for subsequent frames.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method of transferring video through an interface comprising:
   compressing first portions of blocks of coefficients;
   sending the compressed first portion of coefficients to the interface;
   repeating the compressing the first portions and the sending the compressed first portions for frames of a sequence of frames, wherein each frame of the sequence comprises a plurality of blocks of pixels and each block of pixels is represented by a block of the coefficients,
   compressing second portions of the blocks of coefficients;
   sending the compressed second portion of coefficients to the interface; and
   repeating the compressing the second portions and the sending the compressed second portions for the frames of the sequence,
   wherein the compressing and the sending for the second portions are performed after the compressing and sending are performed for the first portions for the frames in the sequence.

2. The method as claimed in claim 1 wherein a reception device receives the compressed first portions for the frames of the sequence prior to receiving the compressed second portions for the frames of the sequence, and
   wherein the reception device decompresses the first and second portions of coefficients, synchronizes with a reference frame of the sequence of frames, and combines the decompressed first portions of coefficients with the decompressed second portions of coefficients of corresponding frames based on synchronization with the reference frame to generate a combined coefficient matrix corresponding with each of the blocks of pixels for each frame in the sequence.

3. The method as claimed in claim 1 wherein each block of coefficients comprises a coefficient matrix generated from transforming a corresponding block of pixels, wherein the first portions and the second portions of each matrix are mutually exclusive.

4. The method as claimed in claim 3 wherein the second portions of coefficients is mutually exclusive of coefficients of the first portions of a corresponding coefficient matrix, and
   wherein both the first and second portions of coefficients of the coefficient matrices represent frequency components of corresponding blocks of pixels.

5. The method as claimed in claim 1 wherein the sequence of frames is a sequence of digital frames and wherein the video is comprised of the sequence of digital frames and wherein the method comprises:
   performing a transformation on each block of pixels of the frames of the sequence resulting in a matrix of coefficients corresponding with each of the blocks of pixels;
   receiving a sequence of analog video frames; and
   converting the sequence analog video frames to the sequence of the digital frames, wherein each pixel is represented by at least one byte.

6. The method as claimed in claim 1 wherein the interface is low data rate interface providing a communication link with a reception device having a data rate between 1 and 20 Mbps.

7. The method as claimed in claim 6 wherein the interface is a universal serial bus (USB) interface.

8. The method as claimed in claim 1 further comprising performing a transformation on each of the blocks of pixels of the frames of the sequence to generate a matrix of coefficients corresponding with each of the blocks of pixels.

9. The method as claimed in claim 8 wherein performing the transformation comprises performing a discrete cosine transform (DCT) on each of the blocks of pixels resulting in a matrix of DCT coefficients for each block of pixels.

10. A method of transferring video through an interface comprising:
    compressing a first portion of a block of coefficients, the block of coefficients representing a block of pixels;
    sending the compressed first portion of coefficients to the interface;
    compressing a second portion of the block of coefficients; and
    sending the compressed second portion of coefficients to the interface,
    wherein a video is comprised of a sequence of frames and wherein each frame of the sequence is comprised of a plurality of blocks of pixels,
    wherein compressing and sending the first portion of coefficients are performed for each block of pixels of each frame in the sequence prior to performing compressing and sending the second portion of coefficients, and wherein the method further comprises:

repeating compressing and sending the first portion of the coefficients for a set of initial frames of the sequence; and performing compressing and sending the second portion of coefficients for each block of pixels for frames subsequent to receiving a switch mode signal, wherein the reception device decompresses and decodes the first portion of coefficients for each frame to match one of the initial frames with a previously sent frame, the method further comprises:

receiving the switch mode signal from the reception device; and switching from compressing and sending the first portion of coefficients to compressing and sending the second portion of coefficients.

11. A method of generating a high quality video bit stream from coefficients received over an interface, wherein each frame of a sequence of frames comprises blocks of pixels, and each block of pixels is represented by a coefficient matrix, the method comprising:

decompressing a first portion of coefficients of the coefficient matrices for each frame of the sequence;

decompressing a second portion of coefficients of the coefficient matrices, the second portions being received for each frame of the sequence subsequent to receipt of first portions; and combining the first and second portions of corresponding coefficient matrices of each frame to generate combined coefficient matrices corresponding with the blocks of pixels.

12. The method as claimed in claim 11 further comprising identifying a reference frame for use in combining the first and second portions.

13. The method as claimed in claim 12 wherein a video is comprised of a the sequence of frames and wherein the method further comprises:

providing a indication to resend the first portions of coefficients for initial frames of the sequence upon completion of receiving the first portions of coefficients for each block of pixels of each frame of the sequence; and identifying a reference from the initial frames.

14. The method as claimed in claim 13 wherein the indication comprises sending a replay signal to a video capture device.

15. The method as claimed in claim 13 wherein the indication comprises displaying a replay signal to instruct a user to replay the video.

16. The method as claimed in claim 11 wherein a video is comprised of the sequence of frames, the method further comprises:

receiving the first portion of the coefficients for each block of pixels for the frames of the sequence over the interface;

storing the first portion of coefficients for each block of pixels for the frames of the sequence; and upon completion of receiving the first portion of coefficients, receiving the second portion of the coefficients for each block of pixels for the frames of the sequence.

17. The method as claimed in claim 11 wherein a video is comprised of the sequence of frames and wherein the method further comprises:

transforming the combined coefficient matrix for each block of pixels of each frame of the sequence to generate a bit stream representing the video; and storing the bit stream.

18. A method of generating a high quality video bit stream from coefficients received over an interface, the method comprising:

decompressing a first portion of coefficients;

decompressing a second portion of the coefficients received subsequent to the first portion; and combining the first and second portions of coefficients to generate a combined coefficient matrix corresponding with a block of pixels, wherein a video is comprised of a sequence of frames and wherein each frame of the sequence is comprised of a plurality of blocks of pixels, each block of pixels being represented by a matrix of coefficients comprised of the first and second portions, and wherein the method further comprises:

receiving for a second time the first portion of coefficients for each block of pixels of initial frames of the sequence;

matching one of the initial frames with a previously received frame to identify a reference frame; and signaling a video capture device to send the second portion of coefficients for each block of pixels of frames subsequent to the reference frame.

19. The method as claimed in claim 18 wherein the first portion of coefficients is comprised of low frequency coefficients of the matrix and the second portion is comprised of high frequency coefficients of the matrix, and wherein signaling the video capture device instructs the video capture device to switch from compressing and sending the low frequency coefficients of the matrix to compressing and sending the high frequency coefficients of the matrix.

20. A system for generating a bit stream representing a high quality video comprising:

a serial interface to receive first portions of coefficients of a plurality of coefficient matrices for frames of a sequence of frames, wherein each frame comprises a plurality of blocks of pixels and each block of pixels is represented by one of the coefficient matrices, the serial interface to further receive second portions of coefficients of the coefficient matrices for the frames after receipt of the first portions;

a decompressing element to decompress the first portion of coefficients and to decompress the second portion of coefficients; and a combining element to combine the first and second portions of coefficients for corresponding frames based on a reference frame to generate a combined coefficient matrices corresponding with the blocks of pixels.

21. A system for generating a bit stream representing a high quality video comprising:

a serial interface to receive first and second portions of coefficients of a coefficient matrix;

a decompressing element to decompress the first portion of coefficients and to decompress the second portion of coefficients, the second portion being received subsequent to the first portion;

a combining element to combine the first and second portions of coefficients to generate a combined coefficient matrix corresponding with a block of pixels; and a processing element to match an initial frame with a previously received frame and send a signal to the interface during a vertical blanking interval, the signal requesting a video capture device to compress and send the second portion of coefficients.

22. The system as claimed in claim 20 further comprising:

a processing element to generate the bit stream from the combined coefficient matrices representing the frames of the sequence; and a storage element for storing the bit stream.

23. A video capture device comprising:

a compressing element to transform blocks of the pixels to corresponding matrices of coefficients and to compress first portions of the coefficients for frames of a sequence of frames, wherein each frame of the sequence comprises a plurality of blocks of pixels and each block of pixels is represented by a block of the coefficients;

a serial interface to send the compressed first portions of coefficients over a serial link for each frame in the sequence; and a controller to instruct the compressing element to compress second portions of the coefficients and cause the compressed second portions of coefficients to be sent to the serial interface for each frame in the sequence after the compressed first portions are sent.

24. The device as claimed in claim 23 wherein the controller instructs the compressing element to compress the second portion of the coefficients in response to a switch mode signal from a reception device coupled with the serial interface.

25. The device as claimed in claim 23 wherein a video is comprised of the sequence of frames, and wherein the compressing element transforms each block of pixels into a matrix of coefficients corresponding with each block of pixels.

26. The device as claimed in claim 25 wherein each matrix of coefficients has a low frequency portion and a high frequency portion, wherein the compressing element compresses the low frequency portions of the coefficients for each matrix of coefficients for the frames of the sequence, and the interface sends the compressed low frequency portions of coefficients for each block of pixels of the frames of the sequence prior to sending the compressed high-frequency portions of coefficients for each block of pixels of the frames of the sequence.

27. The device as claimed in claim 25 wherein the sequence of frames is a sequence of analog video frames, and wherein the device further comprises a decoder element to receive the sequence of analog video frames and to convert the sequence of analog video frames to a sequence of digital video frames, wherein each pixel is represented by at least one byte.

28. The device as claimed in claim 23 wherein the serial interface is a universal serial bus (USB) interface providing a communication link with a reception device and having a data rate between 1 and 20 Mbps, and wherein the compressor includes a hardware accelerator to perform a discrete cosine transform (DCT) on the blocks of pixels resulting in a matrix of DCT coefficients corresponding with each of the block of pixels.

* * * * *